(12) United States Patent
Toyoda et al.

(10) Patent No.: US 10,586,454 B2
(45) Date of Patent: Mar. 10, 2020

(54) SYSTEMS AND METHODS FOR PROMOTING DRIVER ENGAGEMENT USING ACTIVE FEEDBACK

(71) Applicants: Toyota Motor Engineering & Manufacturing North America, Inc., Erlanger, KY (US); Toyota Jidosha Kabushiki Kaisha, Toyota-shi, Aichi-ken (JP)

(72) Inventors: Heishiro Toyoda, Ann Arbor, MI (US); Hiroto Hamada, Aichi (JP)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 199 days.

(21) Appl. No.: 15/631,235

(22) Filed: Jun. 23, 2017

(65) Prior Publication Data

US 2018/0322715 A1    Nov. 8, 2018

Related U.S. Application Data

(60) Provisional application No. 62/501,855, filed on May 5, 2017.

(51) Int. Cl.
*G01G 1/16* (2006.01)
*G06N 20/00* (2019.01)
(Continued)

(52) U.S. Cl.
CPC .............. *G08G 1/16* (2013.01); *B60K 35/00* (2013.01); *B60W 30/08* (2013.01); *B62D 15/029* (2013.01); *G02B 27/0101* (2013.01); *G06K 9/00805* (2013.01); *G06K 9/6277* (2013.01); *G06N 20/00* (2019.01); *G06T 13/80* (2013.01); *G06T 19/006* (2013.01);
(Continued)

(58) Field of Classification Search
CPC ...... G08G 1/16; G08G 1/0112; G08G 1/0962; G08G 1/166; G06N 20/00; B60K 35/00; B60K 2350/1096; B60K 2350/2052; B60W 30/08; B62D 15/029; G02B 27/0101; G02B 2027/014; G06K 9/00805; G06K 9/6277; G06T 13/80; G06T 19/006; G07C 5/0825; G07C 5/0841
See application file for complete search history.

(56) References Cited

U.S. PATENT DOCUMENTS 6,974,414 B2   12/2005  Victor
7,620,497 B2   11/2009  Maass
(Continued)

*Primary Examiner* — Thomas E Worden
(74) *Attorney, Agent, or Firm* — Christopher G. Darrow; Darrow Mustafa PC

(57) ABSTRACT

System, methods, and other embodiments described herein relate to engaging a driver of a vehicle about driving behaviors. In one embodiment, a method includes computing predicted controls according to at least a defined skill level of the driver. The predicted controls indicate how to control the vehicle to maintain the vehicle along a driving path on a roadway. The method includes, in response to receiving manual control inputs from the driver, generating control feedback to the driver about the manual control inputs based, at least in part, on a difference between the manual control inputs and the predicted controls.

20 Claims, 6 Drawing Sheets

(51) Int. Cl.
*B60K 35/00* (2006.01)
*B60W 30/08* (2012.01)
*B62D 15/02* (2006.01)
*G02B 27/01* (2006.01)
*G06K 9/00* (2006.01)
*G06K 9/62* (2006.01)
*G06T 13/80* (2011.01)
*G06T 19/00* (2011.01)
*G07C 5/08* (2006.01)
*G08G 1/01* (2006.01)
*G08G 1/0962* (2006.01)
*G08G 1/16* (2006.01)

(52) U.S. Cl.
CPC ......... *G07C 5/0825* (2013.01); *G07C 5/0841* (2013.01); *G08G 1/0112* (2013.01); *G08G 1/0962* (2013.01); *G08G 1/166* (2013.01); *B60K 2370/186* (2019.05); *B60K 2370/334* (2019.05); *G02B 2027/014* (2013.01)

(56) References Cited

U.S. PATENT DOCUMENTS

| | | | |
|---|---|---|---|
| 8,954,235 B2 | 2/2015 | Lee et al. | |
| 9,047,780 B2 | 6/2015 | Martinez et al. | |
| 9,165,477 B2* | 10/2015 | Wilson | G08G 1/0112 |
| 10,249,196 B2* | 4/2019 | Krnja | B60R 16/005 |
| 2003/0073518 A1* | 4/2003 | Marty | A63B 24/0021 |
| | | | 473/416 |
| 2007/0000989 A1* | 1/2007 | Kadaba | B07C 3/008 |
| | | | 235/375 |
| 2010/0131148 A1 | 5/2010 | Camhi et al. | |
| 2014/0358327 A1 | 12/2014 | Nordbruch | |
| 2015/0360698 A1 | 12/2015 | Beyene et al. | |
| 2017/0088142 A1 | 3/2017 | Hunt et al. | |
| 2017/0267286 A1* | 9/2017 | Takamatsu | B60W 50/16 |
| 2017/0355367 A1* | 12/2017 | Fu | B60W 30/12 |
| 2018/0025647 A1* | 1/2018 | Krnja | B60R 16/005 |
| | | | 340/905 |
| 2018/0218639 A1* | 8/2018 | Ryuzaki | G09B 19/167 |
| 2019/0077413 A1* | 3/2019 | Kondo | B60W 50/0098 |

* cited by examiner

SYSTEMS AND METHODS FOR PROMOTING DRIVER ENGAGEMENT USING ACTIVE FEEDBACK

CROSS REFERENCE TO RELATED APPLICATIONS

This application claims benefit of U.S. Provisional Application No. 62/501,855, filed on May 5, 2017, which is herein incorporated by reference in its entirety.

TECHNICAL FIELD

The subject matter described herein relates in general to systems for providing feedback to a driver about manual control inputs provided by the driver to control the vehicle and, more particularly, to generating the feedback according to a difference between the manual control inputs and predicted controls.

BACKGROUND

Many different factors can influence whether a driver engages with and is aware of driving tasks and environmental aspects relating to the operation of a vehicle. For example, a driver can choose to focus on conversations with other passengers, using personal electronic device, and so on instead of being vigilant and engaged with the surrounding environment. Moreover, even when the driver actively engages with the vehicle, the driver may not exhibit proper driving technique (e.g., safe operation of the vehicle) because, for example, the driver may not have the skill level or experience to know how to control the vehicle within present circumstances.

As a further matter, approaches that provide audible alerts to maintain vigilance and/or to inform the driver of risks can be interpreted as an annoyance by the driver instead of an effective guarantor of engaging the driver. Additionally, if the driver lacks the skills and/or experience to control the vehicle, then the noted alerts may increase anxiety instead of facilitating the driver and thus further complicate the present circumstances. Consequently, the noted approaches fail to adequately engage the driver and facilitate with the operation of the vehicle.

SUMMARY

In one embodiment, example systems and methods relate to a manner of providing feedback to the driver according to manual control inputs from the driver. For example, a feedback system as discussed herein may actively determine a skill level of a driver and/or a progression of how the driver is learning driving skills in order to assess with what degree of expertise the driver can control the vehicle. That is, the feedback system analyzes manual control inputs provided by the driver over, for example, a period of time in order to determine the skill level of the driver. Thereafter, the feedback system computes predicted controls that are commensurate in skill level with the driver but provide for maintaining the vehicle along a driving path (e.g., position, velocity, acceleration) that has characteristics which correlate to the skill level. In other words, the feedback system computes the predicted controls such that the predicted controls are, for example, within capabilities of the driver or just beyond the capabilities of the driver to induce the driver to improve the driving skill level. Moreover, the feedback system computes the predicted controls, in one embodiment, to maintain a particular driving path along a route that minimizes risks (e.g., center of lane travel at or below speed limit). In further aspects, the feedback system can compute the predicted controls and the driving path to be aggressive (e.g., optimal speed for racing) or according to further conditions as may be specified.

In either case, the feedback system compares the predicted controls with manual control inputs received from the driver as the driver controls the vehicle along a route. As a result of the comparison, the feedback system determines a difference between the predicted controls and the manual control inputs. The feedback system generates feedback to the driver that is, for example, proportional to the difference between the controls. That is, the greater the variation of the manual control inputs from the predicted controls, the stronger the feedback that the feedback system produces. Furthermore, in one embodiment, the feedback system generates resistive feedback in input devices of the vehicle as the feedback. Thus, in one embodiment, the feedback system provides resistive feedback in a steering wheel, in a brake pedal, in an accelerator pedal, and so on. In still further embodiments, the feedback system produces the feedback with different characteristics such as by providing the feedback randomly/intermittently instead of continuously (e.g., varying the presence of the feedback, timing of feedback, intensity of feedback according to driver skill level/progression of driver skill level), by generating discrepancies between the manual control inputs and controls provided to the vehicle, by blending the predicted controls with the manual control inputs to provide control inputs with varying degrees of the manual control inputs vs the predicted controls, and so on. In this way, the feedback system provides active feedback to the driver to facilitate engagement of the driver with the surrounding environment and the driving tasks while also training reflexive behaviors of the driving on controlling the vehicle.

In one embodiment, a feedback system for engaging a driver of a vehicle about driving behaviors is disclosed. The feedback system includes one or more processors and a memory. The memory is communicably coupled to the one or more processors and stores a controls module and a feedback module. The controls module includes instructions that when executed by the one or more processors cause the one or more processors to compute predicted controls according to at least a defined skill level of the driver. The predicted controls indicate how to control the vehicle to maintain the vehicle along a driving path on a roadway. The feedback module includes instructions that when executed by the one or more processors cause the one or more processors to, in response to receiving manual control inputs from the driver, generate control feedback to the driver about the manual control inputs based, at least in part, on a difference between the manual control inputs and the predicted controls.

In one embodiment, a computer readable memory for engaging a driver of a vehicle about driving behaviors is disclosed. The computer-readable memory stores instructions that when executed by one or more processors cause the one or more processors to perform functions. The instructions include instructions to compute predicted controls according to at least a defined skill level of the driver. The predicted controls indicate how to control the vehicle to maintain the vehicle along a driving path on a roadway. The instructions include instructions to, in response to receiving manual control inputs from the driver, generate control feedback to the driver about the manual control inputs based, at least in part, on a difference between the manual control inputs and the predicted controls.

In one embodiment, a method for engaging a driver of a vehicle about driving behaviors is disclosed. The method includes computing predicted controls according to at least a defined skill level of the driver. The predicted controls indicate how to control the vehicle to maintain the vehicle along a driving path on a roadway. The method includes in response to receiving manual control inputs from the driver, generating control feedback to the driver about the manual control inputs based, at least in part, on a difference between the manual control inputs and the predicted controls.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
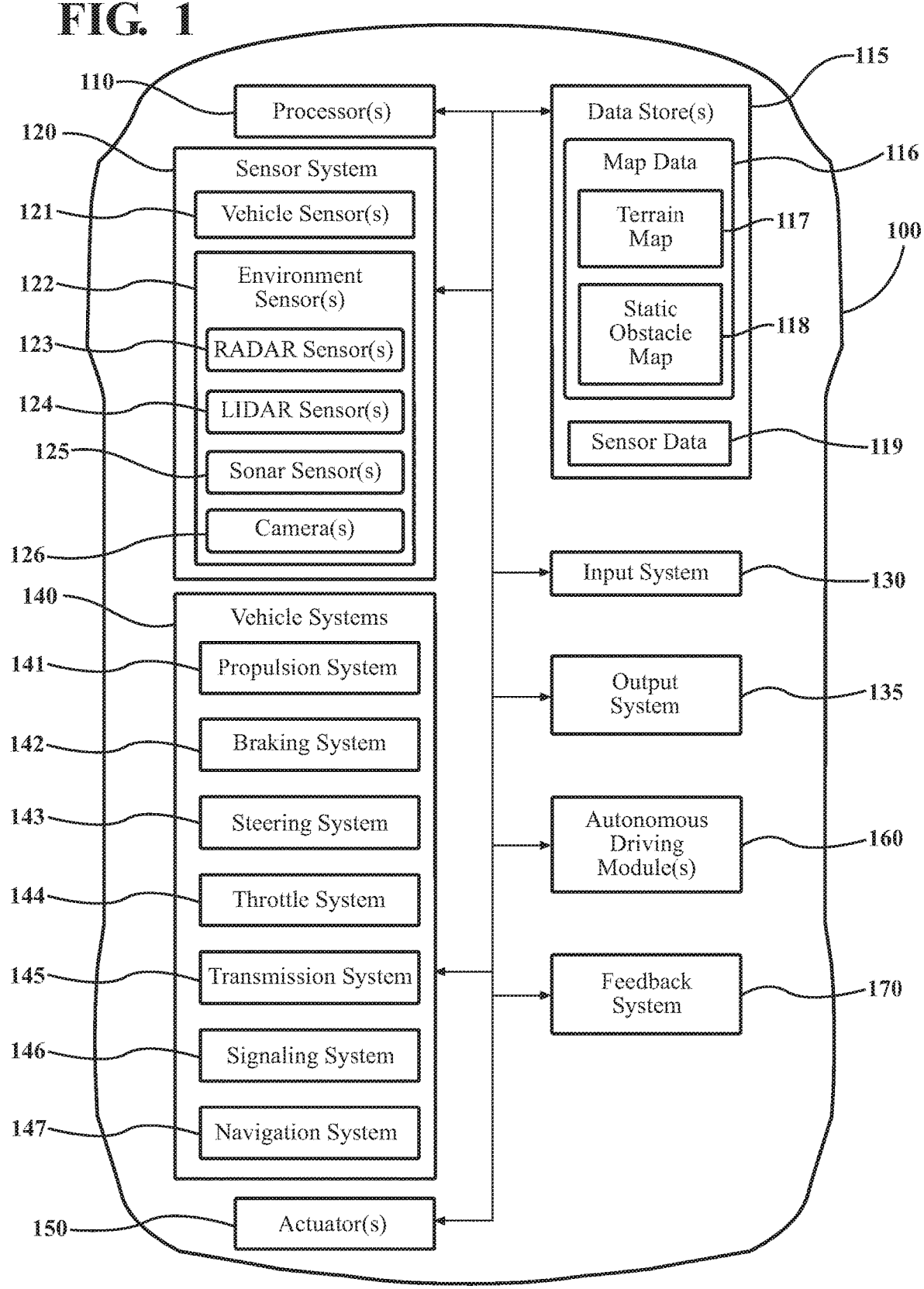
FIG. 1 illustrates one embodiment of a vehicle within which systems and methods disclosed herein may be implemented.

Systems, methods and other embodiments associated with improving driver engagement are disclosed. As mentioned previously, a driver may have insufficient skills to control the vehicle and/or become disengaged from the vehicle and driving tasks for many different reasons. However, whether a skill level of the driver is insufficient or the source of disengagement is actively induced through distracted behaviors, such as using personal electronic devices, inadequate manual controls from the driver present difficulties in relation to safety and appropriate operation of a vehicle.

Thus, embodiments of a feedback system and associated methods are disclosed herein to promote driver engagement with driving tasks and awareness of how to control the vehicle in various circumstances. In one embodiment, functionality implemented by a disclosed feedback system is provided according to analogous concepts associated with the Marginal Value Theorem (MVT). The marginal value theorem generally relates to motivations of an animal to move between foraging locations when seeking food. For example, motivations relating to risks of a present location, efforts to obtain food, and so on control whether an animal decides to remain in a particular location or move to another location to forage. When the various factors are balanced the animal may remain in a present foraging location due to the motivations to stay in-place or a lack of motivations to leave and seek an additional food source. However, an imbalance in the noted factors can motivate the animal to seek further foraging locations.

Thus, in a similar way, the presently disclosed feedback system and associated methods provide for the driver self-engaging on driving tasks. That is, for example, the disclosed feedback system provides for functionality that causes the driver to engage with the vehicle and driving tasks. Accordingly, in one embodiment, the feedback system includes functionality to generate an urge within the driver to engage in boring driving tasks (e.g., monitoring the road, grabbing the steering wheel in a straightaway, generally maintaining vigilance) in an unconscious manner. That is, instead of providing active alerts that are generated to inform the driver that the driver needs to be aware, the feedback system induces feelings or urges within the driver to make the driver want to engage the vehicle and the driving tasks.

Consequently, as described herein in various embodiments, the feedback system can employ active feedback mechanisms (e.g., force feedback through driver input devices) to engage the driver with the vehicle and the surrounding environment of the vehicle. Accordingly, the disclosed systems and methods improve driver engagement on driving tasks and awareness of surroundings through motivating the self-engagement of the driver. Furthermore, the feedback system can inform the driver of how to control the vehicle through the feedback mechanisms and also, for example, at least partially control the vehicle autonomously to maintain safe operation when manual control inputs from the driver are inadequate.

Thus, the feedback system is, for example, implemented within the vehicle along with further systems such as driver monitoring systems (e.g., cameras for eye-tracking), a sensor system, and so on. Accordingly, in one embodiment, the feedback system can induce the driver to engage the vehicle through the use of active feedback that causes the driver to self-engage with the vehicle.

For example, in one embodiment, the feedback system can monitor the surrounding environment to identify aspects about the roadway, objects, obstacles, and so on. Moreover, the feedback system can also monitor aspects of the driver including awareness/engagement, driving behaviors, and other aspects in order to assess a skill level of the driver at controlling the vehicle. Consequently, in one embodiment, the feedback system computes a driving path that is, for example, customized to the skill level of the driver. For example, the feedback system can compute the driving path and associated predicted controls for maintaining the driving path to be commensurate with the skill level (e.g., maneuvers within abilities of the driver), to be aggressive (e.g., optimizing speed), to be cautious (e.g., optimize safety), or according to other characteristics as may be defined.

In either case, the feedback system uses the predicted controls for the driving path to generate active feedback to the driver about manual control inputs provided by the driver for controlling the vehicle. That is, in one embodiment, the feedback system compares the predicted controls with the manual control inputs to derive a metric for determining how closely the driver is controlling the vehicle to the computed driving path. Thus, in one embodiment, the feedback system produces the metric as a difference between the predicted controls and the manual control inputs to determine how closely the driver is controlling the vehicle to the driving path. As a result, the feedback system can generate, for example, active feedback in different forms that either continuously or intermittently indicates to the driver whether the manual control inputs are sufficient or whether the difference from the predicted controls will cause the vehicle to stray from the driving path.

Thus, the feedback system can generate the active feedback as a blend of controls between the predicted controls and the manual control inputs, as resistive/force feedback in driver input devices (e.g., steering wheel), as an exaggerated control (e.g., excessive/larger motion of steering wheel than necessary) to the vehicle, as reinforcing indicators that specify accurate manual control inputs, and so on. In either case, the feedback system generates the active feedback to motivate the driver to self-engage with the vehicle and driving tasks while also informing the driver of how to control the vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a feedback system 170 that is implemented to perform methods and other functions as disclosed herein relating to generating active feedback as a function of manual control inputs provided by a driver. As a result of the feedback system 170 generating the active feedback, the driver is informed about how to control the vehicle 100 and is also, for example, induced to remain engaged with the vehicle 100, and the surrounding environment of the vehicle 100.

Figure 2:
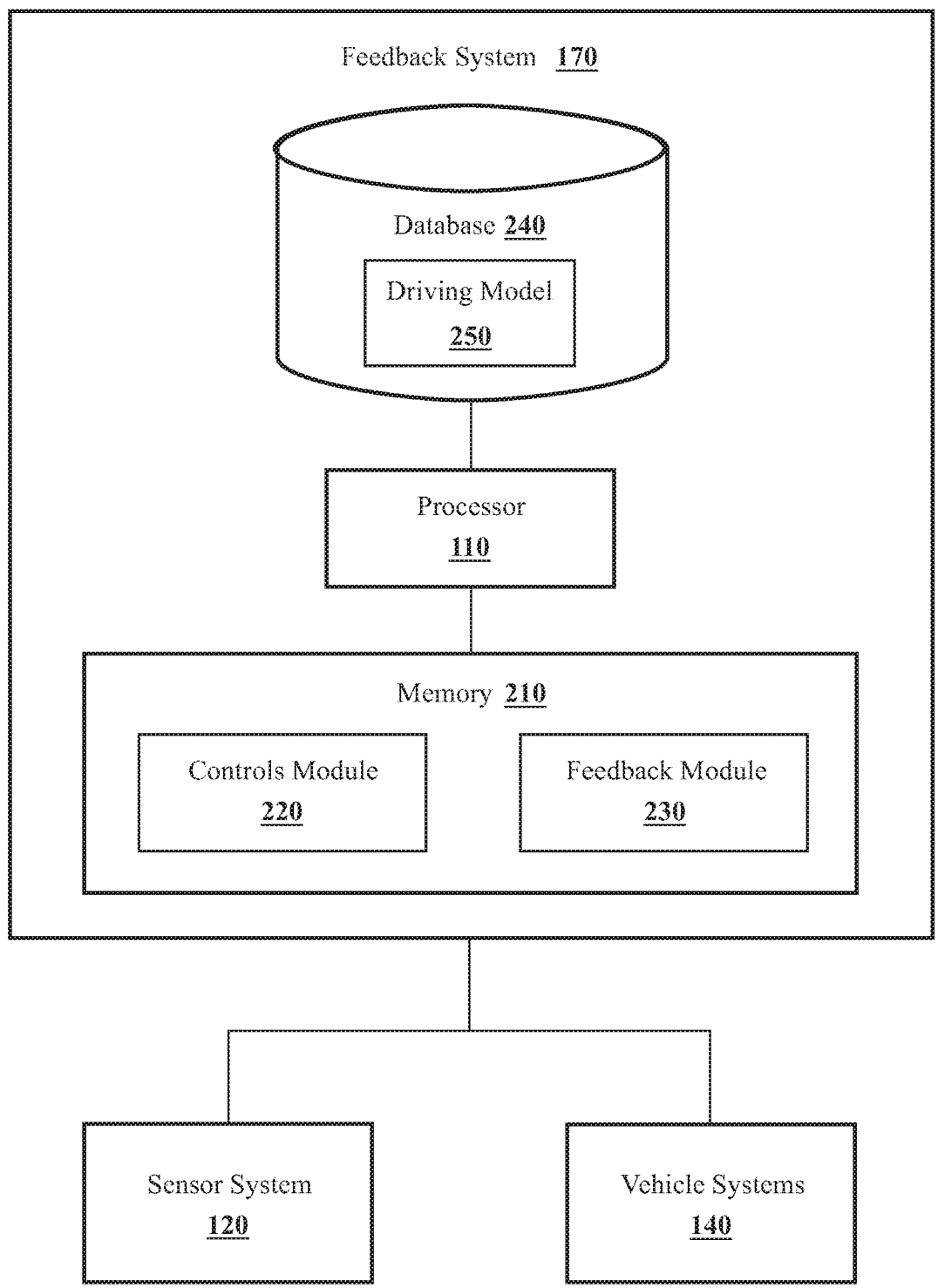
FIG. 2 illustrates one embodiment of a feedback system that is associated with generating feedback to a driver according to manual control inputs.

With reference to FIG. 2, one embodiment of the feedback system 170 of FIG. 1 is further illustrated. The feedback system 170 is shown as including a processor 110 from the vehicle 100 of FIG. 1. Accordingly, the processor 110 may be a part of the feedback system 170, the feedback system 170 may include a separate processor from the processor 110 of the vehicle 100, or the feedback system 170 may access the processor 110 through a data bus or another communication path. In one embodiment, the feedback system 170 includes a memory 210 that stores a controls module 220 and a feedback module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the controls module 220 generally includes instructions that function to control the processor 110 to collect sensor data from one or more sensors of the vehicle 100 and to, in one embodiment, compute predicted controls. The sensor data is, in one embodiment, electronic data that the controls module 220 collects about observations of one or more objects in an environment proximate to and surrounding the vehicle 100. For example, the controls module 220 controls one or more sensors of the sensor system 120 to scan a surrounding environment of the vehicle 100 in order to determine a driving path through the environment. Thus, by way of example, the controls module 220 controls the lidar 124 to generate a point cloud of the surrounding environment and identify objects/obstacles from the point cloud in addition to, for example, boundaries of the roadway on which the vehicle 100 is traveling.

The controls module 220, in combination with, for example, the autonomous driving module 160, can then analyze the surrounding environment and compute the driving path through the surrounding environment including the predicted controls for maintaining the vehicle 100 on the driving path. Moreover, as previously indicated, the feedback system 170 can compute the driving path and the predicted controls as a function of a defined skill level of the driver at controlling the vehicle 100. That is, the controls module 220 can adjust various aspects of how the driving path is computed according to abilities of the driver, preferences of the driver, and/or a present awareness of the driver.

For example, the controls module 220 can collect information about the driver, information about contextual aspects of the present environment (e.g., time of day, the day of the year, school zones, proximity to parks, etc.), and so on. Accordingly, the controls module 220 can control the sensor system 120 to collect data about both the surroundings, a present context, and about a state of the driver. In one embodiment, driver state information is information that characterizes present actions of the driver (e.g., manual control inputs provided by the driver), where a gaze of the driver may be directed, autonomic responses of the driver, biological responses/conditions of the driver, and so on. As a further example, the driver state information can include information about a direction of a gaze, a path/track of the gaze, heart rate, blood pressure, respiratory function, blood oxygen levels, perspiration levels, pupil dilation/size, brain activity (e.g., EEG data), salivation information, hand/arm positions, foot/leg positions, a general orientation of the driver in the vehicle 100 (e.g., forward-facing, rear-facing, etc.), seat position, rate of movement, facial feature movements (e.g., mouth, blinking eyes, moving head, etc.), and so on. It should be appreciated that the present disclosure provides an exemplary listing of aspects associated with the driver that can be monitored to produce the driver state information; however, this listing is not to be construed as limiting and is provided as an exemplary list of possibilities for purposes of this discussion.

Additionally, the controls module 220 can determine the driver state information in multiple different ways depending on a particular implementation. In one embodiment, the controls module 220 communicates with various sensors of the sensor system 120 including one or more of: camera(s) 126 (e.g., for gaze/eye tracking), heart rate monitor sensors, infrared sensors, seat position sensors, and so on. In one embodiment, the sensors are located within a passenger compartment of the vehicle 100 and can be positioned in various locations in order to acquire information about the noted aspects of the driver and/or aspects related to the driver.

In either case, the controls module 220 uses the collected sensor data about the driver to characterize how the driver is operating the vehicle 100 and thus produce the defined skill level of the driver. In one embodiment, the controls module 220 produces the defined skill level by analyzing the sensor data using a machine learning algorithm along with the driving model 250 in order to correlate the known information about the driver with modeled data. As a result of the analysis, the controls module 220 can electronically output the defined skill level as a category (e.g., novice, experienced, professional, etc.), as a rating (e.g., 0-100) or according to another schema. Whichever approach is implemented, the controls module 220 can, in either case, characterize the abilities of the driver using by providing the defined skill level.

Moreover, the controls module 220 can track or otherwise identify a progression of the driver in learning driving skills. For example, in one embodiment, the controls module 220 logs driving activities of the driver and determines how the driving skills of the driver are progressing/improving over time. In this way, the controls module 220 can, for example, customize the driving path and predicted controls generated when the driver is operating the vehicle 100 in order to induce the driver to improve upon particular diving skills. For example, in one embodiment, the controls module 220 dynamically determines the progression of the driver at learning new skills and how the driver is progressing beyond the defined skill level that is used to produce the driving path and the predicted controls. Thus, in one embodiment, the controls module 220 can determine a learning difference between the defined skill level and the present skill level to identify the progression of the driver at learning how to drive. Furthermore, the feedback module 230 can generate the control feedback according to the progression to isolate the feedback in relation to a particular skill/input in order to improve upon how the driver is operating the vehicle 100 and progress the skills of the driver. In either case, the controls module 220, in one embodiment, accounts for the progression when determining the defined skill level.

As a further matter, in one embodiment, the feedback system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 stores the sensor data along with, for example, metadata that characterizes various aspects of the sensor data. For example, the metadata can include location coordinates (e.g., longitude and latitude), relative map coordinates or tile identifiers, time/date stamps from when the separate sensor data was generated, and so on.

Moreover, the database 240 may include one or more computational and/or statistical models such as a driving model 250. In one embodiment, the driving model 250 characterizes the sensor data about the surrounding environment in order to identify the driving path and the predicted controls. That is, the controls module 220 uses the driving model 250 to produce the driving path and the predicted controls according to the sensor data and the skill level of the driver. Accordingly, in one embodiment, the driving model 250 informs the controls module 220 about how to control the vehicle 100 in the surrounding environment according to learned/modeled data. In one embodiment, the driving path indicates a position along the roadway and does not indicate velocity/acceleration. That is, in one embodiment, the controls module 220 produces the driving path and the predicted controls to include only positional information and steering wheel controls. In further embodiments, the controls module 220 produces the driving path and the predicted controls to include positional, velocity, and acceleration controls/information. In general, aspects of the driving path and the predicted controls that are generated by the controls module 220 can be provided according to preference, a skill level of the driver, a learning progression of the driver, and so on. Accordingly, the predicted controls/driving path can be provided with varying numbers of specified controls.

Furthermore, as previously indicated, the driving model 250 can also identify the skill level of the driver according to, for example, present driving behaviors of the driver (e.g., manual control inputs provided by the driver), historical driving data about previous trips of the driver, and other data that can be collected about the driver which characterizes how the driver operates the vehicle 100. Thus, in one embodiment, the controls module 220 can determine the skill level of the driver and characterize the abilities of the driver when controlling the vehicle 100. As a further example, the controls module 220 can characterize which maneuvers the driver is likely capable of performing, how precisely the driver can control the vehicle 100, how engaged/aware the driver is when controlling the vehicle 100, and so on. As such, the controls module 220 can consider the noted factors when generating the driving path and the predicted controls in order to, for example, customize the predicted controls according to the skill level of the driver.

Continuing with FIG. 2, in one embodiment, the feedback module 230 generally includes instructions that function to control the processor 110 to generate active control feedback to the driver about how the driver is controlling the vehicle 100. Thus, the feedback module 230 can compare the predicted controls to manual controls received through input devices (e.g., steering wheel, brake pedal, accelerator pedal) of the vehicle 100 to determine a difference between the controls. Using the determined difference, the feedback module 230 generates active control feedback to the driver to, for example, coach or otherwise indicate to the driver a disparity between the manual control inputs and the predicted controls. Of course, when the difference is zero or is otherwise negligible, the feedback module 230 can, for example, provide positive reinforcement (e.g., illuminating a green light) to the driver about the correlation in controls.

Otherwise, the feedback module 230 generates the active feedback by, for example, blending the predicted controls with the manual input controls according to an extent of the difference, controlling input devices of the vehicle to produce resistance to the manual controls as the manual controls surpass the predicted controls, generating exaggerated controls (e.g., oversteering) to induce the driver to engage the vehicle through providing corrective maneuvers, and so on. In further embodiments, the feedback module 230 can also provide haptic, auditory, and other stimuli associated with the difference between the controls. In still further aspects, the feedback module 230 can emulate hazards and other driving circumstances (e.g., loss of traction) to train the driver about how to control the vehicle 100. Further aspects of generating the active feedback will be discussed in relation to the subsequent figures.

Figure 3:
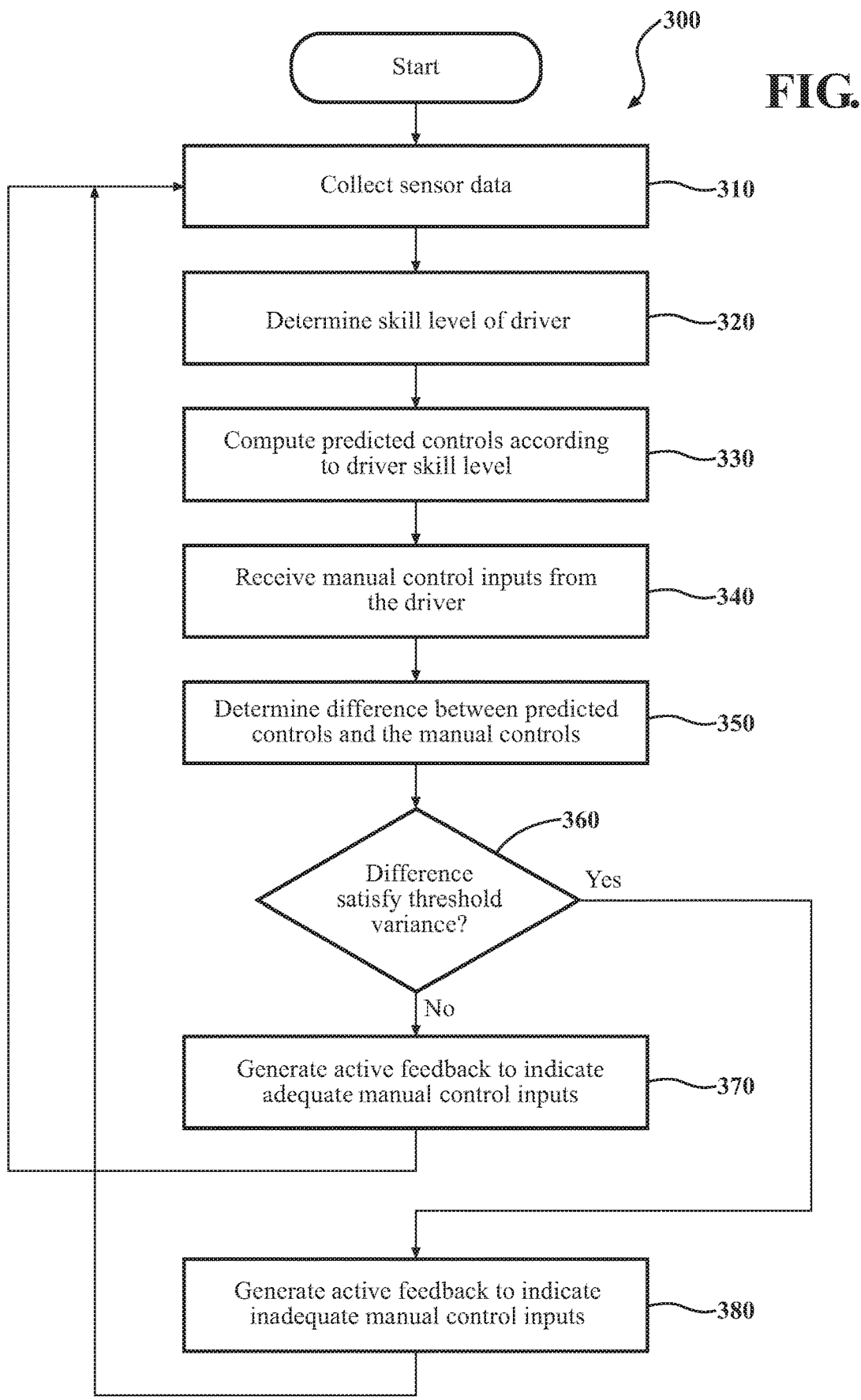
FIG. 3 illustrates one embodiment of a method that is associated with inducing driver engagement by providing active feedback to the driver according to manual control inputs from the driver.

FIG. 3 illustrates a flowchart of a method 300 that is associated with generating active feedback to a driver according to variations in manual control inputs from predicted controls. Method 300 will be discussed from the perspective of the feedback system 170 of FIGS. 1 and 2. While method 300 is discussed in combination with the feedback system 170, it should be appreciated that the method 300 is not limited to being implemented within the feedback system 170, but is instead one example of a system that may implement the method 300.

At 310, the controls module 220 collects data from at least one sensor of the vehicle 100. In one embodiment, the controls module 220 collects data from sensors of the sensor system 120 including lidar 124, radar 123, and/or other sensors on at least a semi-continuous basis. That is, for example, the controls module 220 collects the sensor data every x seconds (e.g., 0.1 s) to maintain an up-to-date view of the surrounding environment. In general, the controls module 220 is operable to collect data from whichever sensors are available within the vehicle 100 and/or collect data from third party sources (e.g., weather sources, traffic sources, etc.) through, for example, a communications system of the vehicle 100.

In either case, the controls module 220 generally collects electronic sensor data for determining a driving path through the surrounding environment and, in one embodiment, information about driving behaviors of the driver. For example, the controls module 220 can collect environmental information, contextual information, and driver state information. The environmental information is information about the surroundings of the vehicle 100 including information about objects (e.g., locations and trajectories), obstacles, terrain, surfaces, roadway boundaries, and so on.

The contextual information is generally ancillary data or metadata about a current location and/or general context including information such as a time of day, a day of the week, geopolitical boundaries, municipal boundaries and special districts (e.g., school zones), local laws (e.g., speed limits, HOV lane restrictions), operating characteristics of the vehicle 100 (e.g., brake wear, oil levels, etc.), weather, road surface conditions, and so on.

The driver state information generally characterizes a current awareness and physical state of the driver and includes, for example, a current gaze/line-of-sight of the driver, eye tracks/movements, rates of eye movements, pupil dilation, control inputs received from the driver through vehicle input devices and patterns of control inputs, and/or other information that is indicative of engagement/awareness of the driver in relation to driving tasks and the surrounding environment. In further embodiments, the driver state information also includes personal monitoring information from a health tracking/monitoring devices such as a personal pedometer, fitness monitor, or the like. For example, the personal monitoring information can include sleep habits, heart rates, food consumption, current weight trends, exercise habits, and so on.

In general, the controls module 220 collects information at 310 that informs the feedback system 170 about the surrounding environment and the driver in order to facilitate providing control feedback to the driver as the vehicle 100 progresses through the surrounding environment. Thus, while the above examples of different forms of data are provided, the noted data is provided as an exemplary listing and should not be construed as a complete/limiting list of data elements.

At 320, the controls module 220 determines a skill level of the driver. In one embodiment, the controls module 220 learns the skill level of the driver by analyzing a log of past driving behaviors and/or current driving behaviors of the driver in order to assess the skill level. In further aspects, the controls module 220 can also determine a progression of the driver at learning skills in order to further characterize the defined skill level of the driver by, for example, comparing a previous skill level with a current skill level, and so on. In general, the skill level of the driver refers to abilities and experience of the driver in relation to performing various driving tasks such as maneuvers (e.g., steering through narrow obstacles) and controlling the vehicle 100 in various driving conditions (e.g., weather, traffic, etc.). Thus, the controls module 220 can analyze the driving behaviors of the driver (both past and present) by processing past manual control inputs in combination with vehicle dynamics data, GPS data, speed data, and other information that informs the controls module 220 about how the driver controlled the vehicle under various circumstances.

Accordingly, the controls module 220 processes the noted data in combination with, for example, the driving model 250 as a machine learning algorithm, neural network, or other computational model that can learn correlations between driving behaviors and driver skill levels and apply the correlations in order to determine a skill level for a particular driver. In this way, the controls module 220 can assess the driver to customize subsequent determinations.

Moreover, in further aspects, the control module 220 can, additionally or alternatively, receive electronic inputs that indicate a particular style of driving path/predicted control inputs and/or that specify a defined skill level. For example, the controls module 220 can receive the electronic inputs via one or more input devices that permit the driver to specify a preferred style of driving (e.g., aggressive, defensive, etc.), a particular type of driving path (e.g., optimize safety), and so on. Furthermore, the electronic inputs can, in one embodiment, specify the skill level instead of the controls module 220 determining the defined skill level or by overriding a defined skill level that was previously determined.

At 330, the controls module 220 computes predicted controls. In one embodiment, the controls module 220 uses the data collected at 310 about the surrounding environment in combination with the skill level and/or indicated preferences of the driver from 320 to generate a driving path for the vehicle 100 that includes the predicted controls. That is, the controls module 220 produces the driving path and the predicted controls as though the controls module 220 where to control the vehicle 100 autonomously without input from the driver and in such a manner as indicated by the defined skill level and/or the preferences. Accordingly, in one embodiment, the controls module 220 can control the autonomous driving module 160 to produce the predicted controls and the driving path. It should be noted that while the driving path and the predicted controls are discussed separately, in general, the driving path is simply a manner of discussing a likely outcome of controlling the vehicle 100 according to the predicted controls. Thus, in various discussions herein the predicted controls and/or the driving path may be discussed individually; however, reference to one generally implies the other.

Thus, in one embodiment, the controls module 220 selects the driving path according to an ability of the driver to maintain the driving path as indicated by the defined skill level. That is, the driving path is selected in such a way that maneuvers and/or circumstances that are to be navigated do not exceed abilities of the driver while still providing for an appropriate (e.g., safe) manner of operating the vehicle 100. Alternatively, in one embodiment, when a preference for learning/coaching has been selected, the controls module 220 can include maneuvers that exceed the defined skill level by, for example, a threshold amount in order to induce the driver to learn how to perform the particular maneuvers and/or navigate more advanced circumstances. In still further aspects, the controls module 220 considers a progression of the defined skill level for the driver over time to produce the driving path so as to accentuate aspects for which the driver needs further improvement.

In either case, the controls module 220 also generates the predicted controls for maintaining the vehicle 100 along the driving path in, for example, an optimal manner (e.g., optimizing safety). Thus, in one embodiment, the controls module 220 in combination with, for example, the driving model 250 form a machine learning algorithm or another computational model that accepts the data from 310 and 320 as an electronic input and produces the predicted controls as an output. Furthermore, the controls module 220, the driving model 250 and the autonomous driving module 160 can act in concert to produce the predicted controls as though the vehicle 100 was being autonomously controlled. As a further matter, while the determination of the predicted controls is discussed as a singular discrete event at 330, it should be appreciated that in various embodiments the collection of data at 310, the computing of the predicted controls at 330, and further aspects of method 300 can occur in parallel and are updated at a rate that accounts for changes in the surrounding environment in order to maintain safe operation of the vehicle 100.

At 340, the feedback module 230 receives manual control inputs from the driver. In one embodiment, the feedback module 230 continuously monitors the various input devices of the vehicle 100 in order to track the manual control inputs and patterns in the inputs provided by the driver. Accordingly, the feedback module 230 can acquire electronic inputs from a steering wheel, a brake pedal, an accelerator pedal, a clutch, a shifter, vehicle indicators, and other manual inputs provided by the driver that are useful in characterizing the operation of the vehicle 100. However, in general, the feedback module 230 can focus on manual control inputs that directly relate to aspects of the trajectory of the vehicle 100 such as the steering wheel and accelerator/deceleration mechanisms.

Moreover, in various implementations, the feedback module 230 can also monitor various aspects relating to the behaviors of the driver including engagement and awareness of the driver about the surrounding environment and driving tasks. Thus, the feedback module 230 can, for example, track eye movements of the driver, gestures of the driver, and/or other aspects relating to the driver as previously mentioned in order to characterize whether the driver is presently engaged with the vehicle 100 and aware of the surroundings. In this way, the feedback system 170 can further target feedback that is subsequently discussed in order to induce appropriate driving behaviors by the driver.

At 350, the feedback module 230 compares the predicted controls with the manual control inputs. In one embodiment, the feedback module 230 compares the separate controls to determine a difference between the predicted controls and the manual control inputs provided by the driver. For example, the feedback module 230 can compare a magnitude for each separate control between the predicted controls and the manual control inputs to determine an extent or degree of mismatch between the controls that is provided as the difference. Furthermore, in various implementations, the feedback module 230 can, for example, generate a combined difference according to a heuristic that operates to characterize an overall difference of the various controls using a single value. Thus, in one embodiment, the feedback module 230 can analyze the predicted controls along with the manual control inputs using a machine learning algorithm or other heuristic that generates an electronic output that characterizes an extent/degree of difference between the controls using a single electronic value. In either case, the feedback module 230 determines how closely the manual control inputs correlate with the predicted controls in order to characterize how closely the driver is controlling the vehicle 100 to the predicted controls.

Moreover, while a single discrete comparison is discussed, it should be appreciated that the feedback module 230 can iteratively compare the manual controls with the predicted controls in an on-going manner and, for example, in parallel with further aspects of the method 300. Thus, as the vehicle 100 progresses along the roadway, the feedback module 230, in one embodiment, iteratively compares the predicted controls with the manual control inputs in order to provide a real-time assessment of how well the driver is controlling the vehicle 100. Moreover, in further aspects, the feedback module 230 can accumulate the differences from multiple comparisons in order to provide a combined comparison over a period of time.

At 360, the feedback module 230 determines whether the difference from 350 satisfies a threshold variance. In one embodiment, the threshold variance defines an extent of difference between the predicted controls and the manual control inputs at which point the feedback module 230 is to, for example, distinguish between providing reinforcing feedback or negative feedback. That is, the threshold variance indicates a point in the difference when the manual control inputs from the driver are considered to be, for example, inadequate to maintain the driving path or within a reasonable margin of the driving path. In one embodiment, the threshold variance is defined as a percent difference from the predicted controls while in further embodiments the threshold variance is defined according to particular amounts (e.g., degrees of steering, depression of pedals, etc.) for each different input. In either case, the feedback module 230 determines whether the difference satisfies (e.g., exceeds, exceeds or equals, etc.) the threshold variance at 360 and proceeds to provide active feedback as discussed at either block 370 or block 380 accordingly.

At 370, the feedback module 230 generates control feedback to the driver about the manual control inputs. In one embodiment, at 370 the feedback module 230 generates the control feedback as a positive indication that the manual control inputs from the driver are within the threshold variance. Accordingly, the feedback module 230 can generate the control feedback as a positive form of active feedback to indicate to the driver that the manual controls are acceptable. By way of example, the feedback module 230 can activate a light, generate an audible sound, generate haptic feedback, change lighting within the passenger compartment to indicate the positive reinforcement, and so on.

Moreover, in various implementations, the feedback module 230 can provide the active control feedback at 370 selectively. That is, the feedback module 230 can determine when to generate and provide the active feedback instead of continuously providing the feedback for each comparison. For example, in one embodiment, the feedback module 230 can provide the control feedback at a defined period of time, randomly, according to a preference/policy, when particular navigation points have been passed (e.g., difficult points along a route or difficult weather conditions), and so on. In either case, the feedback module 230 can provide the active feedback intermittently.

In still further embodiments, the feedback module 230 can generate the active feedback as a training maneuver in the vehicle 100. That is, for example, the feedback module 230 can simulate a low traction event, a tire blowout, or another movement of the vehicle 100 by providing controls to the vehicle 100 that are erratic or otherwise unexpected to the driver. Accordingly, when the driver is controlling the vehicle 100 within the threshold variance, the feedback module 230 can provide the unexpected training controls to induce the driver to correct a path of the vehicle 100 while learning how to account for such circumstances.

At 380, the feedback module 230 generates active control feedback to indicate inadequate controls. In one embodiment, when the feedback module 230 determines that the difference does satisfy the threshold variance (e.g., exceeds) at 360, then at block 380 the feedback module 230 generates the active control feedback according to an extent of the difference between the controls. That is, in one embodiment, the feedback module 230 generates the active feedback to be proportional to the difference between the predicted controls and the manual control inputs.

Furthermore, the feedback module 230 can produce the feedback in different forms depending on a particular implementation and/or preference. For example, the feedback module 230 can generate the feedback as a resistive force against the manual control inputs within input devices of the vehicle 100 used by the driver to provide the manual control inputs. Thus, in one embodiment, as the driver controls the vehicle 100 and provides the manual control inputs, the feedback module 230 determines when the manual control inputs being provided by the driver have exceed the threshold variance and provides resistive/forced feedback against the over control within the input devices. Accordingly, by way of example, the feedback module 230 can resist over steering within the steering wheel, over acceleration in an acceleration pedal, over braking in a brake pedal, and so on. Moreover, in one embodiment, the feedback module 230 can push back against the manual control inputs to cause the input devices to be positioned in a manner that is consistent with the predicted controls when the manual control inputs satisfy the threshold variance.

In further embodiments, the feedback module 230 generates the control feedback by blending the manual control inputs with the predicted controls to control the vehicle 100. Thus, when the manual control inputs satisfy the threshold variance the feedback module 230 can blend the manual control inputs with the predicted controls in increasing preference of the predicted controls as the difference between the controls increases. In this way, even though the driver is not providing adequate manual controls the feedback module 230 can mitigate the inadequate controls while informing the driver of the discrepancy.

In still further embodiments, the feedback module 230 can generate the active feedback as haptic feedback within the input devices of the vehicle 100 that, for example, correlate with a particular manual control input that is inadequate. Alternatively, the feedback module 230 can provide the active feedback as haptic vibrations within all inputs, within a seat of the driver, and so on. In further embodiments, the feedback module 230 can provide additional feedback such as lights, audible feedback, a driving score, and so on in order to inform the driver of how closely the manual control inputs comply with the predicted controls.

As a further matter, in one embodiment, the feedback module 230 generates and provides the active control feedback as discussed at blocks 370 and 380 in a selective/discontinuous manner. That is, the feedback module 230, for example, does not continuously provide the feedback for every event/determination, but instead selectively provides the feedback at defined periods, randomly (e.g., random timing), according to a preference/policy, when particular navigation points have been passed (e.g., difficult points along a route or difficult weather conditions), and so on. In either case, the feedback module 230 can provide the active feedback intermittently at both of blocks 370 and 380.

Figure 4:
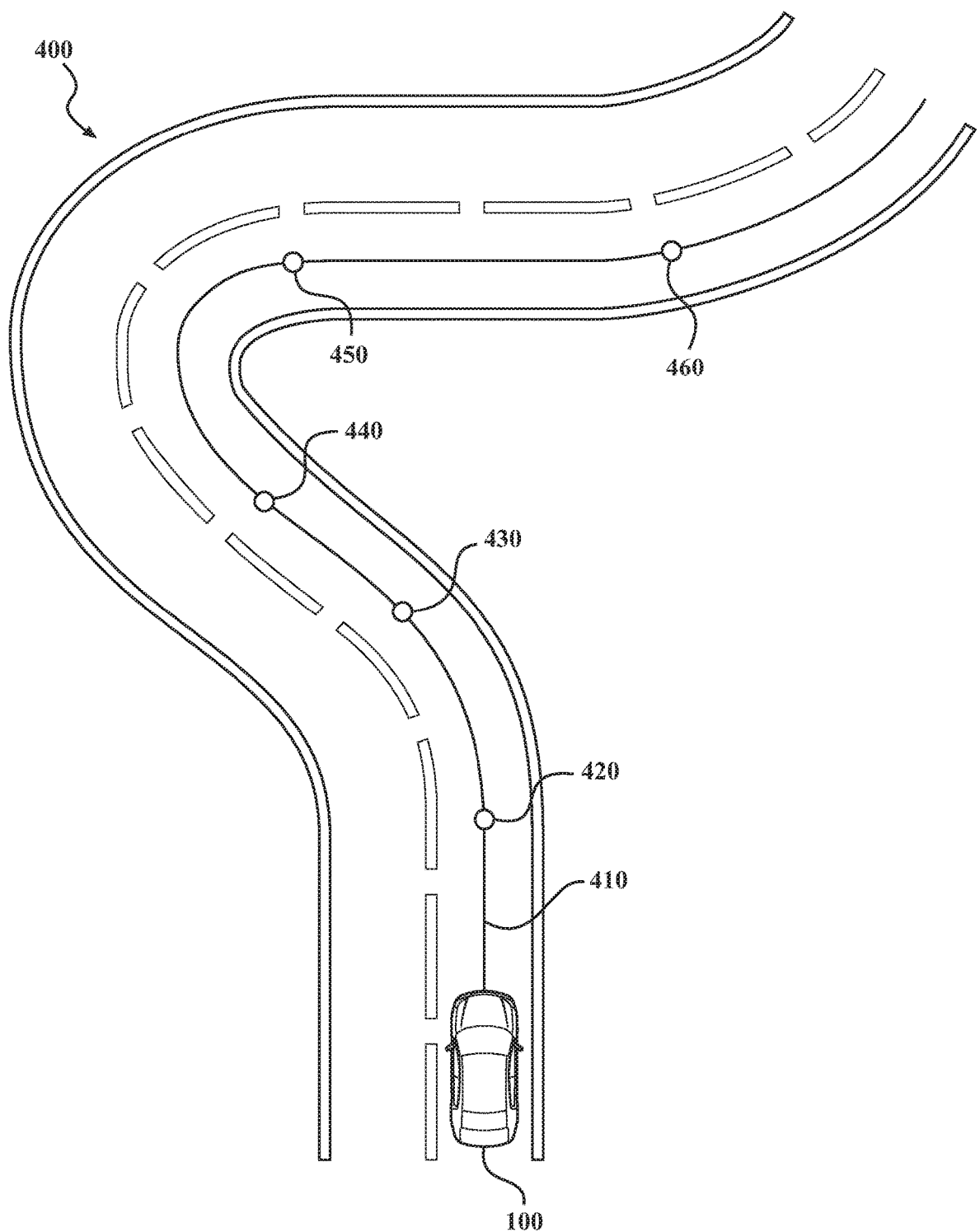
FIG. 4 is an overhead view of a roadway with a vehicle and planned driving path illustrated on the roadway.

Further explanation of the functioning of the feedback system 170 will be discussed in relation to FIGS. 4-6. With reference to FIG. 4, an overhead view of a roadway 400 is illustrated. The roadway 400 is illustrated with the vehicle 100 and a driving path 410. The driving path 410 includes waypoints 420, 430, 440, 450, and 460. The waypoints are provided along with this discussion as means for discussing the driving path 410; however, it should be appreciated that in various embodiments the waypoints 420, 430, 440, 450, and 460 may be included as points for providing feedback to the driver and/or for other purposes. In either case, the driving path 410 is a path along the roadway 400 that has been computed by the controls module 220 according to a defined skill level of the driver. Thus, for purposes of this example, assume that the skill level of the driver is a novice and thus the driving path represents a conservative driving approach that is comprised of predicted controls directed to a novice driver.

The roadway 400 and the driving path 410 will now be discussed along with reference to FIGS. 5 and 6. FIG. 5 illustrates a graph 500 of manual steering controls 510 over the driving path 410 versus predicted steering controls 520. FIG. 6 illustrates a graph 600 of manual accelerator/decelerator controls 610 versus predicted accelerator/decelerator controls 620. As an initial matter, the driving path 410 is provided and illustrated in the various figures as being a static path, however, it should be appreciated that the driving path 410 is illustrated in this manner for purposes of discussion and in general the controls module 220 iteratively recalculates the driving path as the vehicle 100 progresses along the roadway 400.

Figure 5:
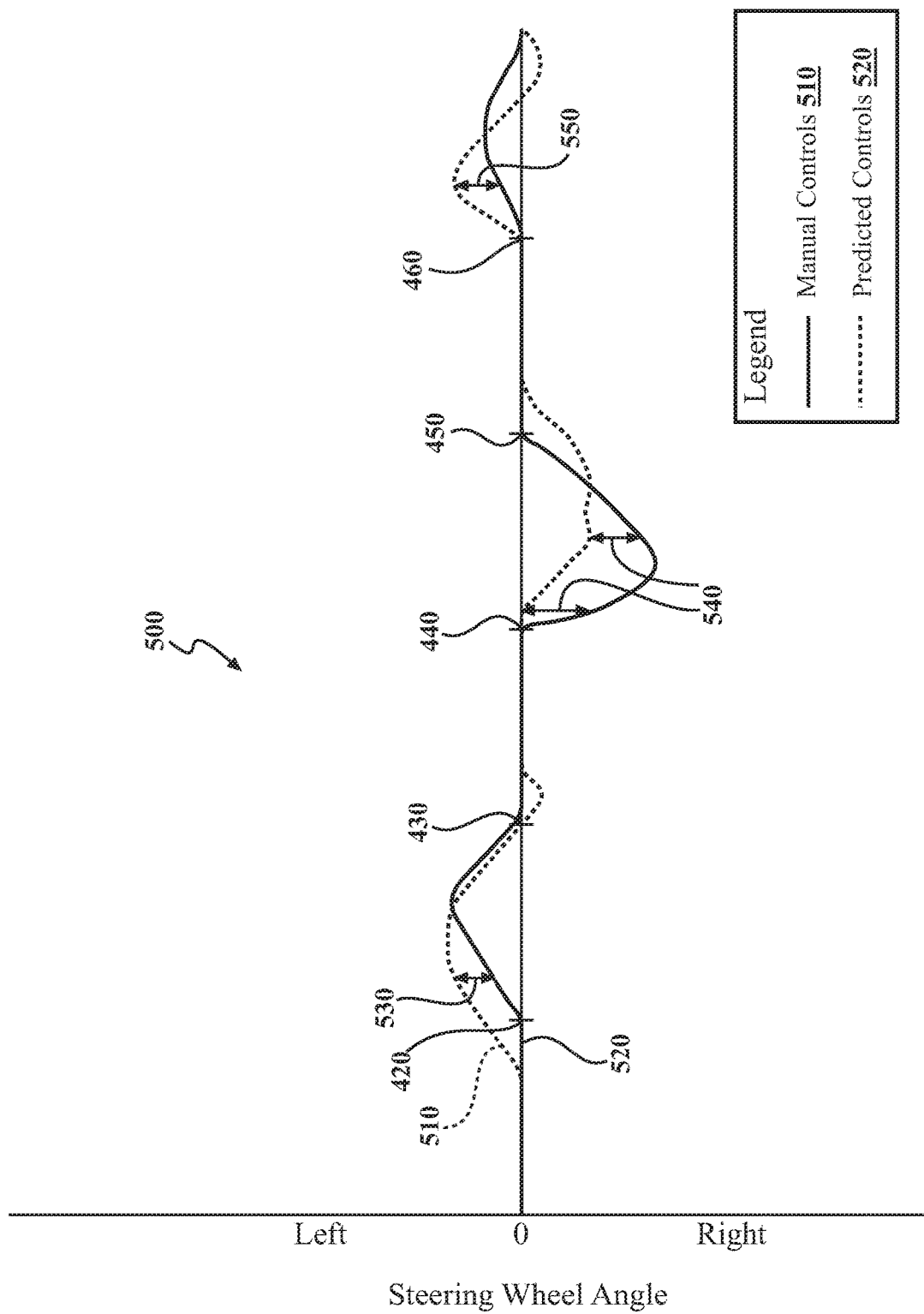
FIG. 5 is a graph illustrating predicted controls for steering on the driving path of FIG. 4 versus manual control inputs from the driver.
Figure 6:
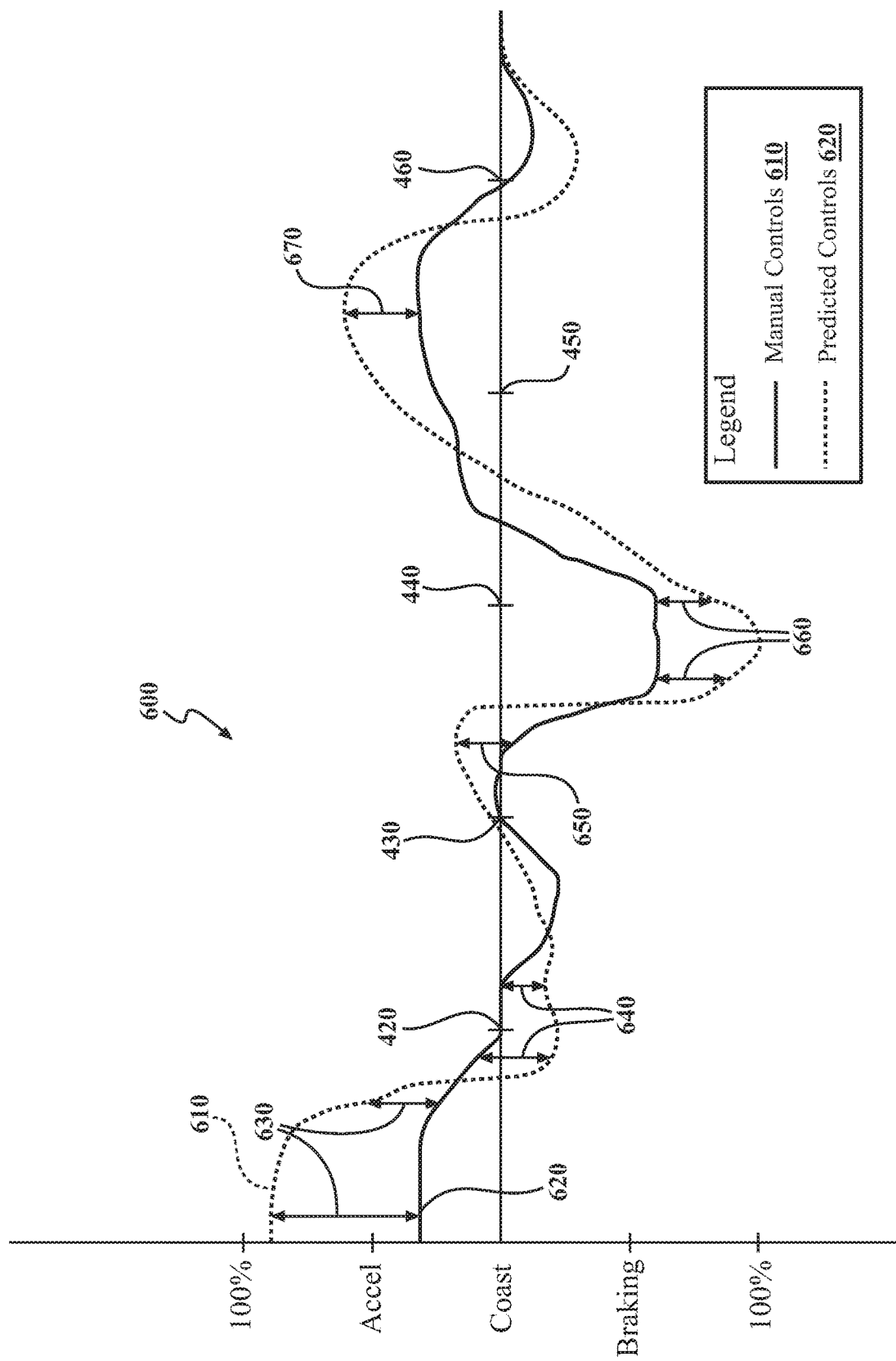
FIG. 6 is a graph illustrating predicted controls for accelerating/braking on the driving path of FIG. 4 versus manual control inputs from the driver.

In either case, the differences between the predicted steering controls 520 and the manual control inputs 510 are illustrated at 530, 540, and 550 in FIG. 5. The illustrated differences indicate instances where the manual steering controls 510 are, for example, inadequate to maintain the driving path and thus satisfy the threshold variance. Accordingly, the noted instances of 530, 540, and 550 represent instances where the feedback module 230 can generate active feedback to the driver indicating that the manual controls are not appropriate.

Moreover, differences between the manual accelerator/decelerator inputs 610 and the predicted controls 620 are illustrated at 630, 640, 650, 660, and 670. The instances at 630, 640, 650, 660, and 670 represent deviations from the predicted controls 620 by the manual controls 610, and are thus instances where the feedback module 230 may generate the active feedback. As a further matter, it should be noted that some of the instances (e.g., 530, 550, 650, and 670) are illustrated as discrete occurrences whereas other instances (e.g., 540, 630, 640, and 660) are illustrated as occurring over a duration of time. Accordingly, in the various instances where the inputs vary for an extended period, the feedback module 230 can, for example, generate the active feedback over the whole occurrence, iteratively during the occurrence, at a start and end of the occurrence, or in another manner as may be indicated by preferences or the particular implementation. In either case, the feedback system 170 monitors the various controls along with computing the driving path in order to generate the active feedback that improves engagement of the driver with the driving tasks while informing the driver how improved ways of controlling the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle driver (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the feedback system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the feedback system 170, and/or the autonomous driving module(s) 160 may control some or all of these vehicle systems 140 and, thus, may be partially or fully autonomous.

The processor(s) 110, the feedback system 170, and/or the autonomous driving module(s) 160 can be operatively connected to communicate with the various vehicle systems 140 and/or individual components thereof. For example, returning to FIG. 1, the processor(s) 110, the feedback system 170, and/or the autonomous driving module(s) 160 can be in communication to send and/or receive information from the various vehicle systems 140 to control the movement, speed, maneuvering, heading, direction, etc. of the vehicle 100. The processor(s) 110, the feedback system 170, and/or the autonomous driving module(s) 160 may control some or all of these vehicle systems 140.

The processor(s) 110, the feedback system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the feedback system 170, and/or the autonomous driving module(s) 160 can control the direction and/or speed of the vehicle 100. The processor(s) 110, the feedback system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the feedback system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A feedback system for engaging a driver of a vehicle about driving behaviors, comprising:
one or more processors;
a memory communicably coupled to the one or more processors and storing:
a controls module including instructions that when executed by the one or more processors cause the one or more processors to compute predicted controls to maintain the vehicle along a driving path on a roadway, the driving path is defined according to a defined skill level of the driver in relation to a range of skill levels for controlling the vehicle differently along the roadway,
wherein the predicted controls indicate how to control the vehicle to perform maneuvers including steering, braking, and accelerator inputs corresponding with the defined skill level, and wherein the controls module includes instructions to compute the predicted controls for the driving path including instructions to generate the driving path to include the maneuvers within the defined skill level of the driver; and
a feedback module including instructions that when executed by the one or more processors cause the one or more processors to, in response to receiving manual control inputs from the driver, generate control feedback to the driver about the manual control inputs based, at least in part, on a difference between the manual control inputs and the predicted controls, wherein the feedback module includes instructions to generate the control feedback including instructions to selectively provide reinforcing feedback and negative feedback according to whether the difference satisfies a threshold variance,
wherein the controls module further includes instructions to determine a progression of the defined skill level of the driver over time according to at least a previous skill level of the driver, and
wherein the feedback module includes the instructions to generate the control feedback according to the difference and the progression of the defined skill level of the driver to induce the driver to improve the defined skill level.

2. The feedback system of claim 1, wherein the feedback module includes the instructions to generate the control feedback by providing the control feedback to a defined degree according to an extent of the difference between the manual control inputs and the predicted controls,
wherein the feedback module includes instructions to generate the control feedback intermittently according to a random timing, and wherein the feedback module includes instructions to vary the control feedback by generating the feedback with a varying intensity, and a varying timing.

3. The feedback system of claim 1, wherein the feedback module includes the instructions to generate the control feedback including instructions to blend the predicted controls with the manual control inputs according to an extent of the difference between the manual control inputs and the predicted controls to control the vehicle to avoid straying from the driving path and to inform the driver of the difference.

4. The feedback system of claim 1, wherein the feedback module includes the instructions to generate the control feedback including instructions to modify the manual control inputs by generating resistive feedback in the manual control inputs when the manual control inputs vary from the predicted controls.

5. The feedback system of claim 1, wherein the feedback module includes the instructions to generate the control feedback including instructions to control an input device of the vehicle to apply a resistive force in opposition to the manual control inputs using a force feedback mechanism in the vehicle to control the vehicle according to the predicted controls instead of the manual control inputs.

6. The feedback system of claim 1, wherein the controls module further includes instructions to:
collect sensor data from one or more sensors of the vehicle by electronically controlling the one or more sensors to at least semi-continuously scan a surrounding environment of the vehicle to detect objects and obstacles in the surrounding environment, and
wherein the sensor data includes environmental information about the surrounding environment of the vehicle including objects and obstacles in the surrounding environment.

7. The feedback system of claim 1, wherein the controls module further includes instructions to:
determine the defined skill level of the driver according to a log of previous driving activity about the driver using a machine learning algorithm to model the defined skill level for the driver.

8. The feedback system of claim 1, wherein the controls module includes the instructions to compute the predicted controls including instructions to generate the predicted controls as a function of the defined skill level and sensor data collected from one or more sensors of the vehicle, and,
wherein the threshold variance defines an extent of deviation from the predicted controls that is acceptable before generating the control feedback as the negative feedback, the predicted controls identify expected controls for the defined skill level of the driver for current driving conditions associated with the driving path along the roadway.

9. A non-transitory computer-readable medium for engaging a driver of a vehicle about driving behaviors and storing instructions that when executed by one or more processors cause the one or more processors to:
compute predicted controls to maintain the vehicle along a driving path on a roadway, the driving path is defined according to a defined skill level of the driver in relation to a range of skill levels for controlling the vehicle differently along the roadway,
wherein the predicted controls indicate how to control the vehicle to perform maneuvers including steering, braking, and accelerator inputs corresponding with the defined skill level, and wherein the instructions to compute the predicted controls for the driving path include instructions to generate the driving path to include the maneuvers within the defined skill level of the driver; and
in response to receiving manual control inputs from the driver, generate control feedback to the driver about the manual control inputs based, at least in part, on a difference between the manual control inputs and the predicted controls, wherein the instructions to generate the control feedback include instructions to selectively provide reinforcing feedback and negative feedback according to whether the difference satisfies a threshold variance,
wherein the instructions further include instructions to determine a progression of the defined skill level of the driver over time according to at least a previous skill level of the driver, and
wherein the instructions to generate the control feedback include instructions to generated the control feedback according to the difference and the progression of the defined skill level of the driver to induce the driver to improve the defined skill level.

10. The non-transitory computer-readable medium of claim 9, wherein the instructions to generate the control feedback include instructions to provide the control feedback to a defined degree according to an extent of the difference between the manual control inputs and the predicted controls,
wherein the instructions to generate the control feedback include instructions to modify the manual control inputs by generating resistive feedback in the manual control inputs when the manual control inputs vary from the predicted controls,
wherein the instructions to generate the control feedback include instructions to generate the control feedback intermittently according to a random timing, and
wherein the instructions to generate the control feedback include instructions to vary the control feedback by generating the control feedback with a varying intensity, and a varying timing.

11. The non-transitory computer-readable medium of claim 9, wherein the instructions to generate the control feedback include instructions to blend the predicted controls with the manual control inputs according to an extent of the difference between the manual control inputs and the predicted controls to control the vehicle to avoid straying from the driving path and to inform the driver of the difference.

12. The non-transitory computer-readable medium of claim 9, wherein the instructions to compute the predicted controls include instructions to generate the predicted controls as a function of the defined skill level and sensor data collected from one or more sensors of the vehicle,
wherein the threshold variance defines an extent of deviation from the predicted controls that is acceptable before generating the control feedback as the negative feedback, the predicted controls identify expected controls for the defined skill level of the driver for current driving conditions associated with the driving path along the roadway.

13. The non-transitory computer-readable medium of claim 9, wherein the instructions to generate the control feedback include instructions to control an input device of the vehicle to apply a resistive force in opposition to the manual control inputs using a force feedback mechanism in the vehicle to control the vehicle according to the predicted controls instead of the manual control inputs,
wherein the instructions further include instructions to determine a progression of the defined skill level of the driver according to at least a previous skill level of the driver, and wherein the instructions to generate the control feedback include instructions to generate the control feedback according to the difference and the progression of the defined skill level of the driver.

14. A method for engaging a driver of a vehicle about driving behaviors, comprising:
computing predicted controls to maintain the vehicle along a driving path on a roadway, the driving path is defined according to a defined skill level of the driver in relation to a range of skill levels for controlling the vehicle differently along the roadway,
wherein the predicted controls indicate how to control the vehicle to perform driving maneuvers including steering, braking, and accelerator inputs corresponding with the defined skill level, and wherein computing the predicted controls for the driving path includes generating the driving path to include the driving maneuvers within the defined skill level of the driver; and in response to receiving manual control inputs from the driver, generating control feedback to the driver about the manual control inputs based, at least in part, on a difference between the manual control inputs and the predicted controls, wherein generating the control feedback includes selectively providing reinforcing feedback and negative feedback according to whether the difference satisfies a threshold variance, wherein the defined skill level is determined as a progression of the defined skill level over time according to at least a previous skill level of the driver, and wherein generating the control feedback includes generating the control feedback according to the difference and the progression of the defined skill level of the driver to induce the driver to improve the defined skill level.

15. The method of claim 14, wherein generating the control feedback includes modifying the manual control inputs according to an extent of the difference between the manual control inputs and the predicted controls and by generating resistive feedback in the manual control inputs when the manual control inputs satisfy the threshold variance from the predicted controls, wherein generating the control feedback includes generating the control feedback intermittently according to a random timing, wherein generating the control feedback includes varying the control feedback by generating the control feedback with a varying intensity, and a varying timing, and wherein computing the predicted controls includes computing the driving path according to the defined skill level and a manner of operating the vehicle that optimizes safety.

16. The method of claim 14, wherein computing the predicted controls according to the skill level of the driver includes generating the predicted controls for the driving path as a function of the defined skill level and sensor data collected from one or more sensors of the vehicle, wherein the threshold variance defines an extent of deviation from the predicted controls that is acceptable before generating the control feedback as the negative feedback, the predicted controls identifying expected controls for the defined skill level of the driver for current driving conditions associated with the driving path along the roadway.

17. The method of claim 14, wherein generating the control feedback includes blending the predicted controls with the manual control inputs according to an extent of the difference between the manual control inputs and the predicted controls to avoid the vehicle from straying from the driving path.

18. The method of claim 14, wherein generating the control feedback includes controlling an input device of the vehicle to push back against the manual control inputs using a force feedback mechanism in the vehicle to control the vehicle according to the predicted controls instead of the manual control inputs.

19. The method of claim 14, further comprising:
collecting sensor data from one or more sensors of the vehicle by electronically controlling the one or more sensors to at least semi-continuously scan a surrounding environment of the vehicle to detect objects and obstacles in the surrounding environment, wherein the sensor data includes environmental information about the surrounding environment of the vehicle including objects and obstacles in the surrounding environment.

20. The method of claim 14, further comprising:
determining the defined skill level of the driver according to a log of previous driving activity about the driver using a machine learning algorithm to model the defined skill level for the driver.

* * * * *